July 16, 1929.  A. R. RIDDERSTROM  1,721,049
SKIVING MACHINE
Filed Aug. 25, 1919   8 Sheets-Sheet 1

Inventor:
A. R. Ridderstrom
by Clyde L Rogers
his Atty.

July 16, 1929. A. R. RIDDERSTROM 1,721,049
SKIVING MACHINE
Filed Aug. 25, 1919    8 Sheets-Sheet 2

Inventor:
A. R. Ridderstrom
by Clyde L. Rogers
his Atty.

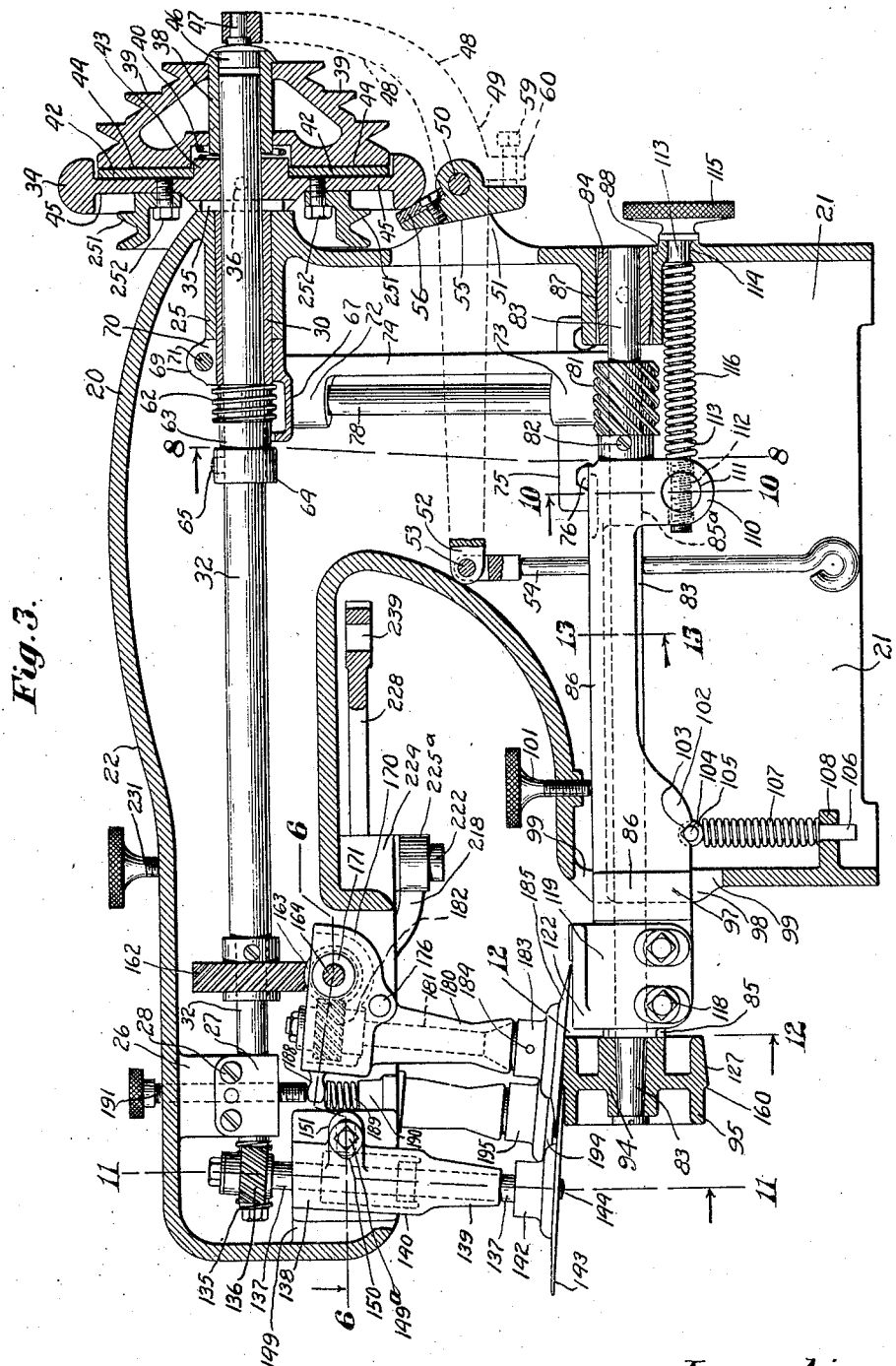

July 16, 1929.　　A. R. RIDDERSTROM　　1,721,049
SKIVING MACHINE
Filed Aug. 25, 1919　　　8 Sheets-Sheet 4
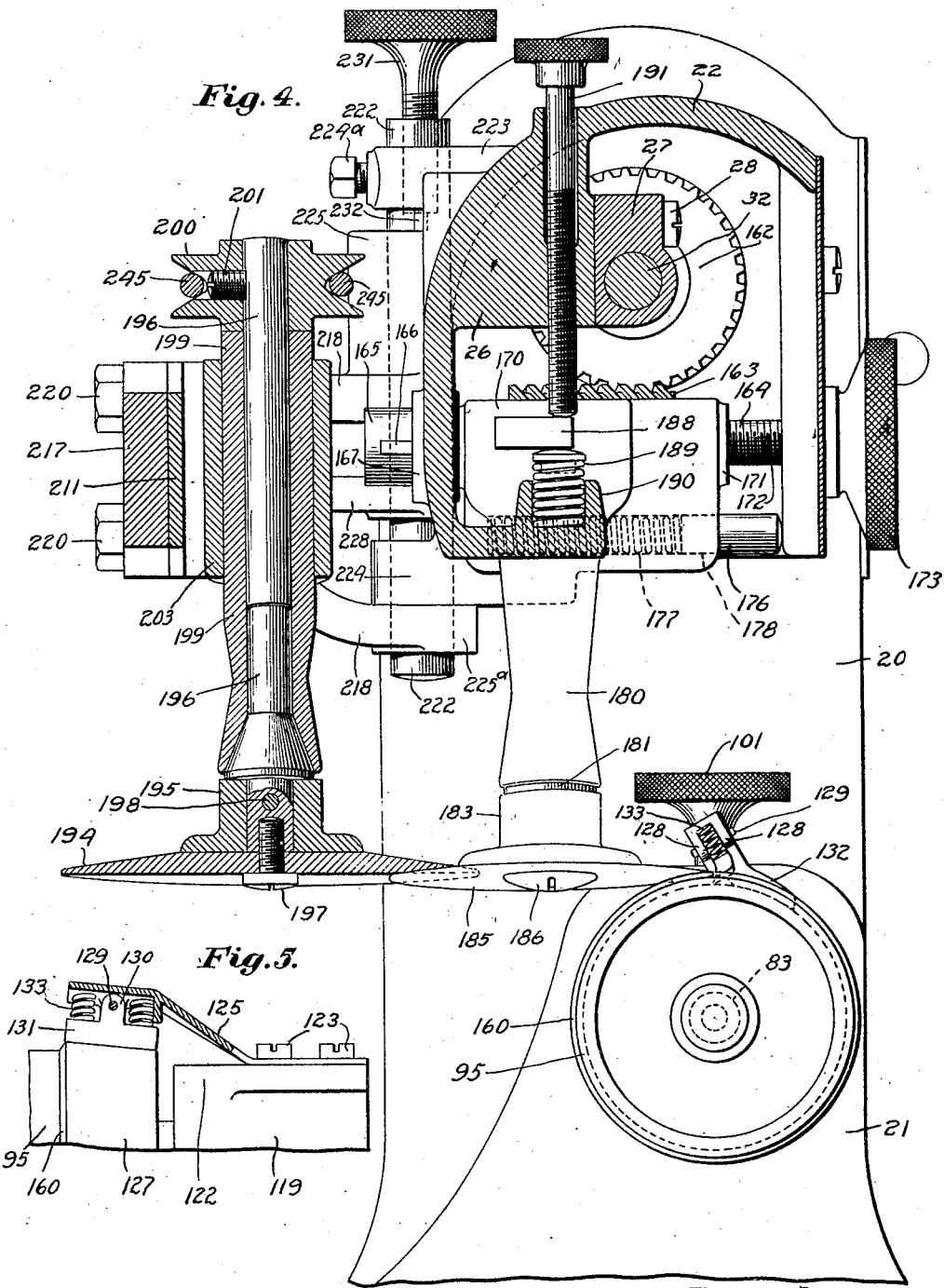

July 16, 1929.  A. R. RIDDERSTROM  1,721,049
SKIVING MACHINE
Filed Aug. 25, 1919  8 Sheets-Sheet 5

Inventor:
A. R. Ridderstrom
by Clyde L. Rogers
his Atty.

July 16, 1929. A. R. RIDDERSTROM 1,721,049
SKIVING MACHINE
Filed Aug. 25, 1919  8 Sheets-Sheet 6
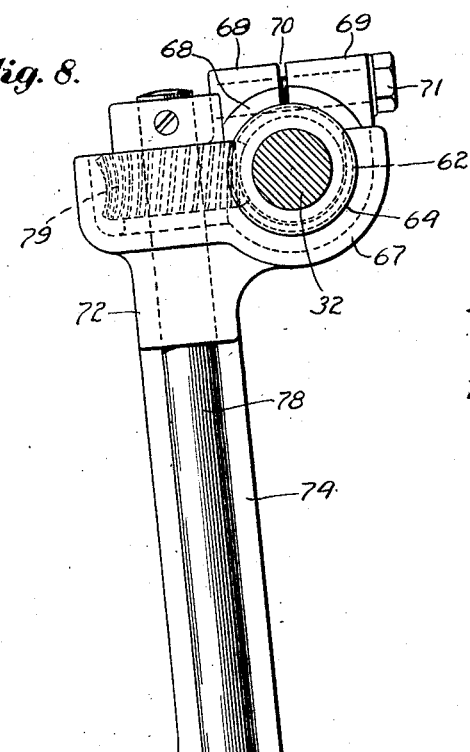
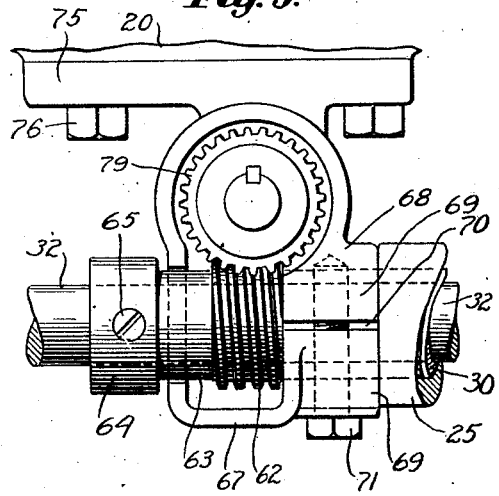
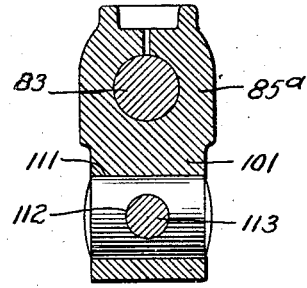
Inventor:
A. R. Ridderstrom
by Clyde L. Rogers
his Atty.

July 16, 1929.   A. R. RIDDERSTROM   1,721,049
SKIVING MACHINE
Filed Aug. 25, 1919   8 Sheets-Sheet 7

Inventor:
A. R. Ridderstrom
by Clyde L. Rogers
his Atty.

July 16, 1929.   A. R. RIDDERSTROM   1,721,049
SKIVING MACHINE
Filed Aug. 25, 1919   8 Sheets-Sheet 8
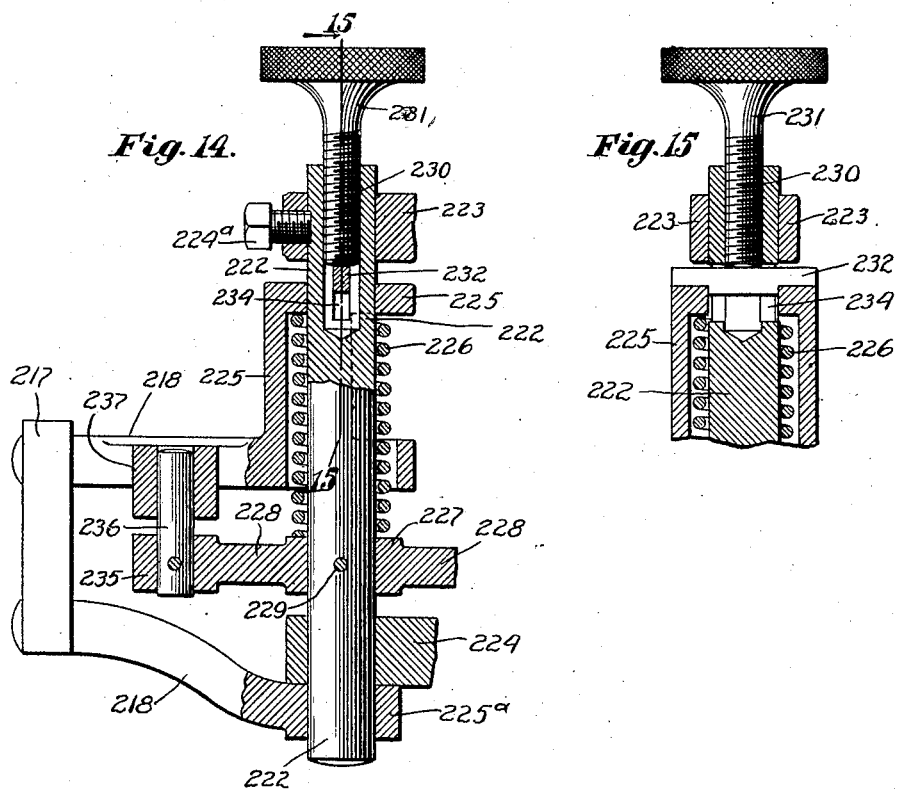
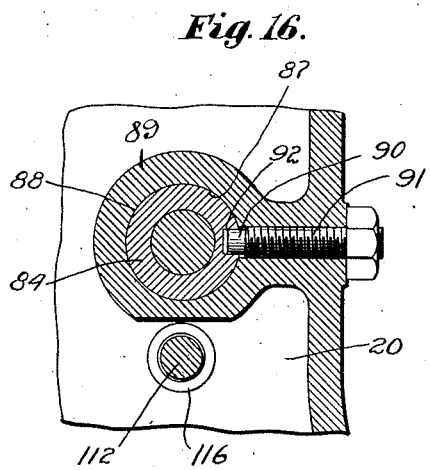
Inventor:
A. R. Ridderstrom
by Clyde L. Rogers
his atty.

Patented July 16, 1929.

1,721,049

UNITED STATES PATENT OFFICE.

ANDREW R. RIDDERSTROM, OF NAHANT, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

SKIVING MACHINE.

Application filed August 25, 1919. Serial No. 319,565.

This invention relates to skiving machines which, by reason of special combinations and arrangements of the parts, are adaptable to a wide variation in kinds of work and universal adjustments for skiving materials such as leather, etc. To render the machine adaptable for a wide range of skiving uses and for general skiving, it is equipped with suitable driving means which always remains in the same co-operative relation to the driven means irrespective of all changes of relative positions resulting from said adjustments. The adjustments enable the machine to handle various thicknesses of material and to vary the nature, the extent and the angle of the scarf.

The feed disk is provided with driving means of a nature that will permit of its adjustment or movement both axially and transversely without disturbing the driving relation. The feed disk is also provided with means permitting yielding axial movement in order that a comparatively constant feeding pressure may be exerted upon the material to feed the same.

The skiving disk or knife may be so adjusted in a plane or in parallel planes as to be capable of operating at substantially any angle relative to the feed roll within the range of adjustment without changing the co-operative relation of the driving means and the associated driven means. All driving gearing remains in the same meshing relation irrespective of the relative movement of the same due to changes of the angle of the scarf. The improved adjusting elements also have novel features which allow of a change of the angle of the scarf and transverse adjustments with respect to the feed roll and also with respect to the main driving means.

Further improvements have provision for any angular adjustment of the knife grinding mechanism with respect to the knife with mechanism for moving and maintaining the grinder in and out of grinding relation therewith. Also there are provided axial and other adjustment features connected with the support of the grinder shaft which produce improved results in the grinding of the said knife.

Other features of the invention have provision for vertical and axial adjustment of the main feed roll together with improved arrangements in driving mechanism therefor adapted always to co-operate irrespective of these adjustments. Also the feed roll is provided with spring or yielding pressure applying means functioning with the feed disk in both the transverse and axial directions. The foregoing and other objects and advantages of the invention will more fully appear from the following detailed description in which the terms employed are used in the generic and descriptive sense to designate parts and elements and therefore are not primarily intended as terms of limitation. The distinctive features of novelty will be more fully pointed out in the appended claims.

In the accompanying drawings illustrating my invention, I have indicated but a single embodiment thereof, wherein:

Fig. 3 is a central vertical section substantially on line 3—3 of Fig. 1;

Fig. 4 is a transverse vertical section substantially on line 4—4 of Fig. 1;

Fig. 5 is a side elevation of a detail of the guide with a portion broken away to show the parts, the same not being described or claimed herein because constituting the subject matter of a copending application, Serial No. 668,346, filed October 13, 1923;

Fig. 8 is an enlarged vertical sectional detail substantially on line 8—8 of Fig. 3;

Fig. 9 is an enlarged plan of the detail illustrated by Fig. 8;

Fig. 10 is an enlarged vertical sectional detail substantially on line 10—10 of Fig. 3;

Fig. 14 is an enlarged vertical section substantially on line 14—14 of Fig. 1;

Fig. 15 is a transverse vertical section on line 15—15 of Fig. 14; and

Fig. 16 is a vertical section on line 16—16 of Fig. 2.

The skiving machine herein illustrated, for convenience merely, is of the bench type usually employed for handling light skiving, but the invention is not limited thereto.

Figure 1:
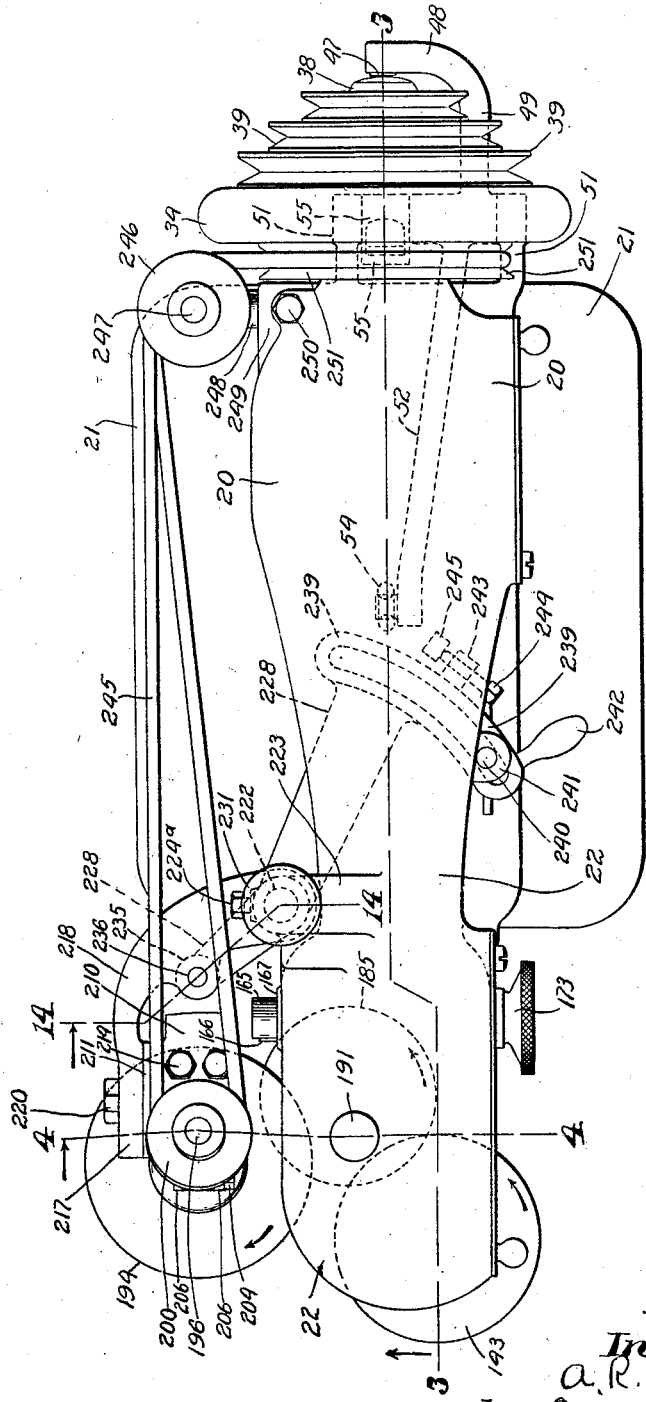
Fig. 1 is a plan of a skiving machine embodying my invention.
Figure 2:
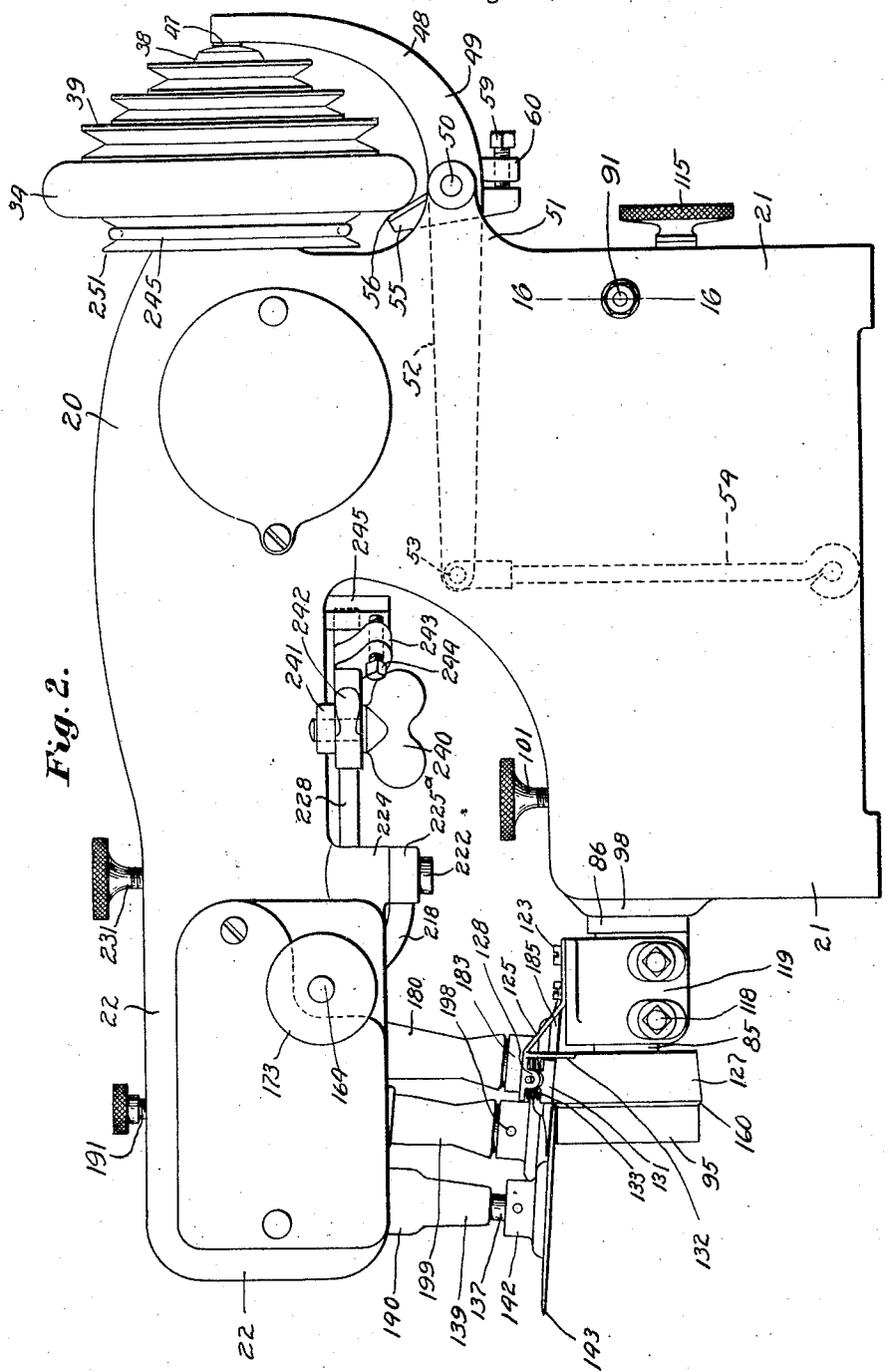
Fig. 2 is a side elevation thereof.

The main frame, represented by the numeral 20, is provided with a base portion 21 that may be bolted to a bench or the like, and with an overhanging arm or head 22 that projects over the base, as will be understood from an inspection of Figs. 1, 2 and 3. The overhanging arm 22 carries a skiving knife 185 and a feed disk 143. The base portion 21 houses the feed-roll mechanism and the drive elements therefor, the feed roll 95 itself projecting forward beyond the base portion.

A main bearing 25, Fig. 3, extends longitudinally of the head 22 at the upper portion, and to the rear, of the main frame 20. A projection or lug 26, that is provided with another main bearing 27, is fastened to the front end of the head 22 by screws 28. A bearing sleeve 30 extends forward through the bearing 25, and the projecting end of the sleeve 30 supports a bracket 68. A shaft 32 is journaled in the sleeve 30 and the bearing 27.

A hand wheel 34 has a key at 35 and a set screw 36 to secure it to the shaft 32. Revoluble on the end of the shaft 32 is a sleeve 38 supporting a cone or step pulley 39 and interposed between the latter and said hand wheel 34 is a spring 40 normally tending to separate the two. A friction disc 42 is mounted for rotation and for free axial movement upon the hub 43 of the hand wheel and is adapted to be frictionally engaged by the inner face of the disk web 44 on said cone pulley and the outer face of the disk web 45 of the said hand wheel. The said inner and outer faces thus act as clutch elements when the cone pulley is moved axially inwardly. The said spring 40 tends to unclutch said elements or move said cone pulley axially outwardly to release the co-acting inner and outer faces of the webs 44 and 45 respectively from engagement with the friction disk 42. A friction plug 46 has a button head that is adapted to be engaged by the friction plug 47 at the end of the arm 48 of the bell-crank lever 49. The lever 49 is pivoted at 50 between ears 51 on the frame 20. Pivotal movement of the lever 49 will thus result in the said cone pulley 39 being moved inwardly against the outward thrust of the spring 40, causing the friction disk to be gripped, as above described. The shaft 32 may then be driven or rotated by belts or the like, not shown, that connect the cone pulley 39 to a source of power in a well known manner.

The bell-crank lever 49 may be actuated by an actuating rod 54 that is pivotally connected at 53 to the end 52 of the lever 49 and that extends downwardly through the frame 20 to a foot-operated treadle, lever or the like (not shown). According to whether this treadle is depressed more or less, the clutch faces of the webs 44 and 45 will engage the friction disk 42 more or less firmly, thus providing for varying the speed of the machine. Rockably mounted at 50, at one side of the hub of the bell-crank lever, and between the same and one of the ears 51, is a brake member 55 having a friction face 56 of leather, fibre or the like. The face 56 is adapted to engage frictionally the periphery of the hand wheel 34 to stop its rotation upon the release of the treadle and the bell-crank lever that is connected thereto, the spring 40 then acting to disengage the said cone pulley from the friction disk 42. A lug on the brake member 55, that is adapted to be engaged by an adjusting screw 59 provides the means whereby the brake member 55 is forced into engagement with the periphery of the hand wheel 34. The force of the engagement may be adjusted by adjustably threading the screw 59 in a lug 60 upon the bell-crank lever.

As before stated, the sleeve 30 projects inwardly beyond the main bearing 25. Secured to the main driving shaft 32, at the end of said sleeve, is a worm 62. The latter may be of any suitable construction or design, but is herein shown as integral with a sleeve 63 and a collar or hub 64, whereby it may be secured to the shaft 32 by a pin or a set screw 65 tapped through the collar and tightly engaging the said shaft. Surrounding said worm is the housing 67 provided with the clamping bracket 68 having ears 69 that are split at 70. A clamping screw 71 passes through one ear and is tapped into the other ear. The said bracket 68 is adapted to be clamped to the end of the sleeve 30 that projects beyond the bearing 25 by the said screw 71, as is illustrated by Figs. 3, 8 and 9. The bracket 68 is provided with a top bearing 72, a lower bearing 73 and a depending strut or brace 74 connecting and alining said bearings. A lugs 75 adjacent to the lower bearing 73 is adapted to be bolted to the frame 20 by means of the bolts 76.

Figure 12:
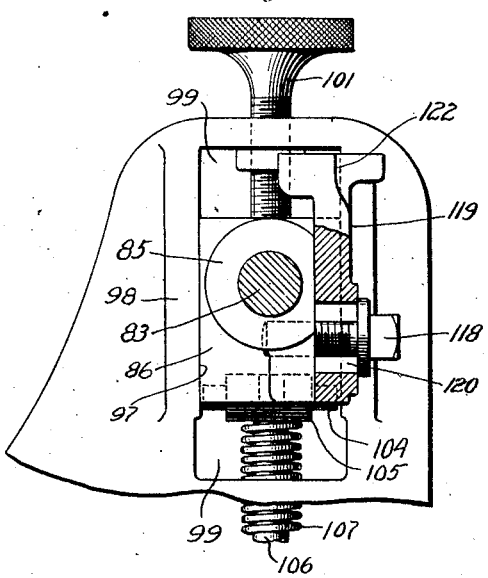
Fig. 12 is an enlarged vertical sectional detail substantially on line 12—12 of Fig. 3 with the left hand portion broken away.
Figure 13:
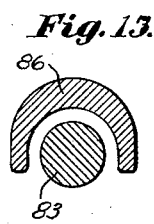
Fig. 13 is a vertical section on line 13—13 of Fig. 3.

Rotatable in the bearings 72 and 73 is a shaft 78 transversely disposed relative to the main driving shaft 32. Secured to the upper end of the shaft 78 by a key or a set screw is a worm gear 79 that meshes with the worm 62 and is rotated thereby. Secured by a key or a set screw to the lower end of the shaft 78, beneath the bearing 73, is a spiral gear 80 that meshes with a transversely disposed spiral gear 81. The gear 81 is secured by a set screw 82 or the like to a feed-roll shaft 83 that is journaled in an oscillative bearing 84 and in bearings 85 and 85$^a$, see Figs. 3 and 12, through a sub-frame 86. The bearing 84 tapers or is rounded slightly from the middle 87 thereof towards each end, or in an axial direction, so that the same can be rocked within the bore 88 through the inward projecting hub 89. A stud 90, on the end of a screw 91, extends into an opening or bore 92 that is provided at the middle of the bearing 84, where the diameter of the bearing is greatest, to facilitate this rocking action. The stud 90 serves also to maintain the bearing 84 within the bore 88 to prevent axial and rotatable movements of the bearing. Upward and downward, or rocking, movements of the bearing about the stud 90 as an axis are not, however, prevented. Therefore the shaft 83 may be rocked upward or downward for adjustment or other purposes and carry with it the bearing 84. The sub-frame 86 is wholly supported upon the shaft 83 and extends from the hub of the spiral gear 81 to the hub 94 of the feed roll 95. The bearing 85 is adjacent to the said feed roll while the bearing 85ª is adjacent to the hub of the said spiral gear 81, so that there is no axial movement of the said sub-frame 86 and said bearings relative to the shaft 83 but, as will be described hereinafter, there is axial movement of sub-frame and said shaft relative to the oscillative bearing 84 while the said shaft is also rotatable therein. The sub-frame 86 is provided with guiding faces 97 to render it vertically slidable between the flanges 98 on each side of the opening 99 in the frame through which the sub-frame 86 extends. Thus, the sub-frame has an upward and downward movement and therefore can adjust the position of the shaft 83 and also, under certain operating conditions, may rock the same. The upward movement of the sub-frame 86 is determined or limited by the adjusting screw 101 tapped through the top of the base portion 21 and bearing against the top face of said sub-frame. The lower face of the skirt 102 is provided with a notch 103 engaged by the trunnions 104 on a stud 105 at the top of a rod 106. The rod 106 is surrounded by the spring 107 and is guided at its lower end in the bore through the lug 108 that is mounted on the base 21 and projects into the interior of the same. Therefore sufficient pressure against the feed roll 95 compresses the spring 107, and the sub-frame 86, the shaft 83 and bearing 84 may be said to be rocked about the stud 90 to and from the adjusting screw 101. In addition to the adjustments and movements just described I provide also for the axial adjustment and movement of the said shaft 83 and the feed roll 95.

The axial adjustment and movement of the shaft 83 and the feed roll 95, whereby the length of the scarf may be varied, will now be described. Improved arrangements in the driving and driven mechanisms of the feed roll adapt them always to cooperate irrespective of the adjustment.

Depending from the bearing 85ª is a lug 110 having a transverse bore 111 through which is rotatable a cylindrical nut threaded at 112 transverse to its axis to receive the threaded shaft 113. The said lug is counterbored in axial alinement with said shaft and said counterbore is large enough to allow swiveling of said nut 112 and said shaft 113. The shaft 113 extends rearwardly and projects through the bore 114 through the frame 20, where it is provided with a knurled hand wheel or head 115. A spring 116 is compressed between said frame 20 and the lug 110, normally to maintain the sub-frame 86 in a forward position and yieldable rearwardly. Said shaft 113 is adjusted to provide for the adjustment of the said sub-frame 86 to move the feed roll 95 and shaft 83 axially. During this axial adjustment, the teeth of the spiral gear 81 will slip slightly through the teeth of the spiral gear 80 without unmeshing. It will be noticed that all the associated or co-operating parts described will permit of the above described universal adjustments and yielding both downwardly and axially, the screw 101 providing for vertical adjustments of the feed roll and the screw or threaded shaft 113 for the axial adjustments.

To the extreme left hand end of the driving shaft, see Fig. 3, and suitably secured thereto is a worm 135 meshing with the worm gear 136 keyed or bolted to the upper end of the feed disk shaft 137 journaled at 138 and 139 in the adjustable bearing 140. The lower end of said shaft 137 has secured thereto by means of a pin 141, a key or the like, a flanged collar 142. A feed disk 143 is secured to said collar by means of a screw 144 and relative rotation is prevented between the two by means of the dowel 145. The feed disk is adjustable transversely, but is yieldable in an axial direction only. The said bearing 140 is grooved at 147 to engage with the tongue or slide 148 on the rib 149 interiorly of the head 22 and a clamp screw 149ª tapped into the same passes through the horizontally elongated slot 150 through the lug 151 on said bearing. The transverse adjustment may be effected, when desired, by unscrewing the screw 149ª, adjusting the bearing 140 bodily, and again tightening the screw 149ª. Such adjustment is sometimes desirable for different classes of leather. In this manner, the feed disk may be adjusted forwardly, rearwardly, and sidewise, and the feed roll may be adjusted to correspond. Ordinarily, however, very slight adjustments of the feed disk are unnecessary, as the desired result may be equally well obtained by adjusting instead the feed roll axially, which may be effected through the threaded shaft 113 and the nut 115. Between the journals 138 and 139 the said bearing 140 is recessed at 153 and a collar 154 is clamped at 155 to the feed disk shaft 137 and normally rests upon the top face of the journal 139. Adjacent the journal 138 is a washer 156 slidable relatively to said shaft and to prevent relative rotation between the two said washer is provided with a lug 157 co-operating with the key slot 158 extending longitudinally of said shaft. A spring 159 is interposed between said washer 156 and the said collar 154 and is adapted to yieldingly force said collar 154 and the shaft 137 in a downward direction. Therefore the feed disk 143 is yieldingly forced downwardly so that its working edge will co-operate with the shoulder 160 on the feed roll 95 and at the same time yield axially when leather is fed between the said disk and said roll. The feed disk 143 normally presents an angular working relation with respect to the feed roll 95 and the driving gearing just described is such that both axial and transverse movement may be had between said gears without disengagement thereof either for adjustments or when performing work, the teeth of the gear 136 merely slipping through the teeth of the worm 135.

Figure 6:
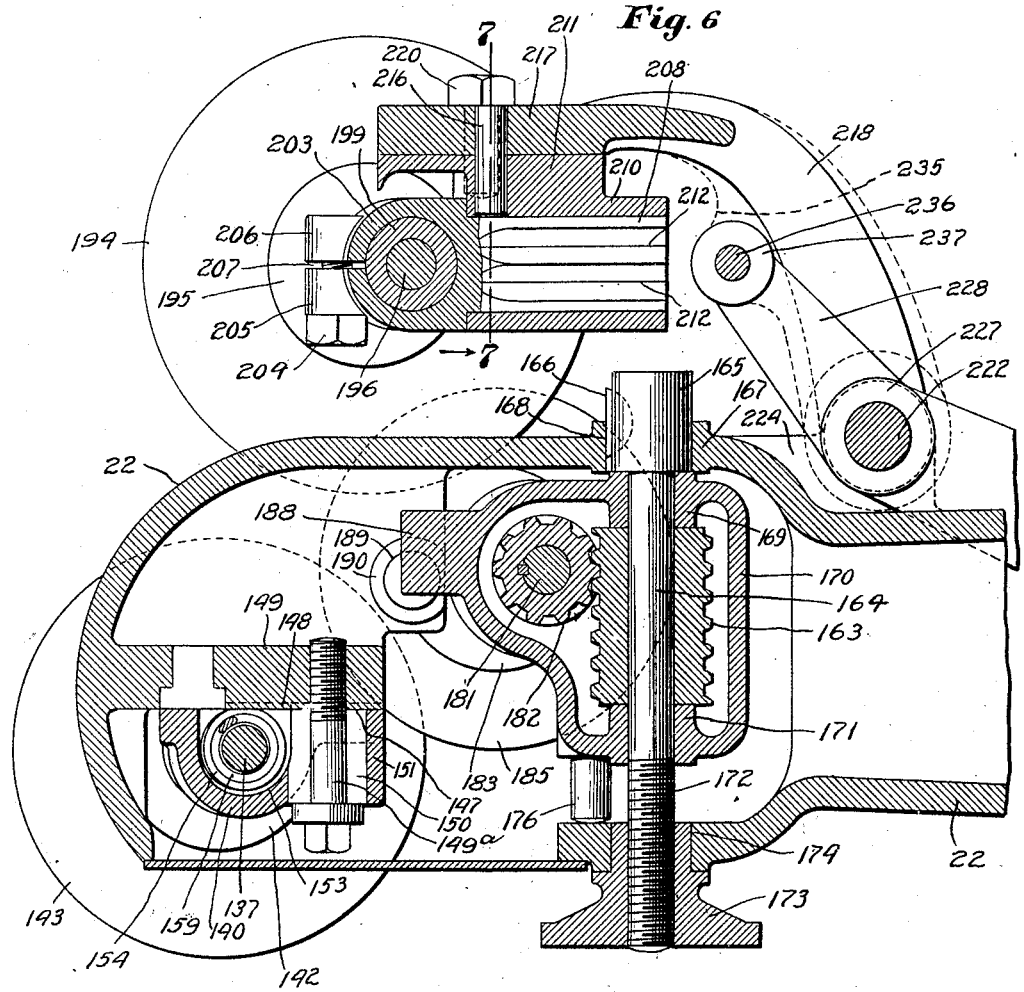
Fig. 6 is a horizontal section substantially on line 6—6 of Fig. 3, looking downwardly.
Figure 7:
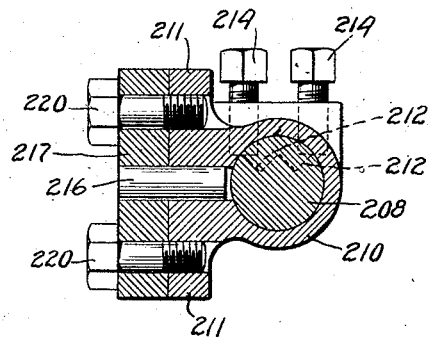
Fig. 7 is an enlarged vertical sectional detail substantially on line 7—7 of Fig. 6.
Figure 11:
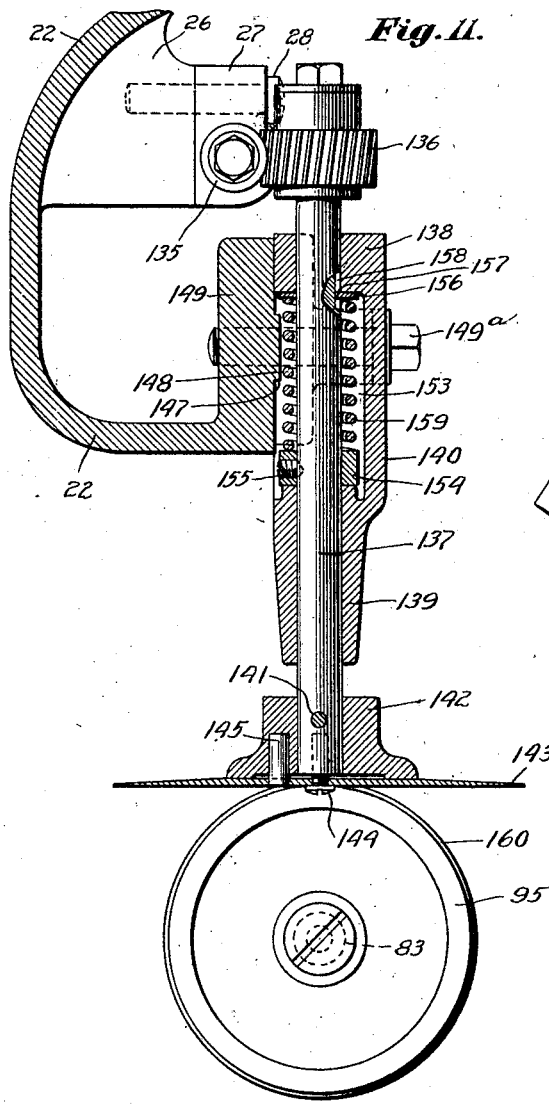
Fig. 11 is an enlarged vertical sectional detail substantially on line 11—11 of Fig. 3.

To the right of the bearing 27 in Fig. 3 the driving shaft 32 is provided with a spiral gear 162 meshing with the elongated spiral pinion 163 that is freely rotatable upon the cylindrical rod 164. The latter is provided with an enlarged head 165 (Fig. 6) having a key 166 each slidable axially in the bearing 167 at one side of the head 22 and having a key way 168 therein. The shoulder formed by said enlargement engages the bearing 169 formed at one side of the bracket 170 while the opposite end of the rod 164 passes through the bearing 171 at the opposite side of said bracket. The end of the rod 164 is threaded at 172 into a hand operated nut 173 journaled and rotatable in the bearing 174 at the opposite side of said head 22. The bracket 170 is provided with a recessed portion and the said pinion 163 is located therein between the bearings 169 and 171. A plunger 176 backed by a spring 177 (Fig. 4) both located within the bore 178 in the said bracket and parallel to the rod 164 engages the inner face of the head 22 and serves at all times to yieldingly maintain the said bracket towards one side of the said head and against the said shoulder formed by said enlargement 165. When the hand nut 173 is rotated in a clockwise direction axial movement is imparted to the rod 164 to draw the same towards said nut which causes the said shoulder to push the bracket towards the nut against the action of the spring 177 and changes the position of said bracket and the pinion 163 without causing the slightest disengagement thereof with said spiral gear 162. Rotation of said hand nut 173 in an anti-clockwise direction allows the said spring 177 and plunger 176 to act to move the said bracket away from the said hand nut without disengagement of said gears. The knife bracket is thus rendered adjustable transversely of the feed roll towards and from the operator. Integral with said bracket and depending therefrom is a bearing 180 having rotatable therein the skiving knife shaft 181 provided at its upper end with a spiral pinion 182 and provided at its lower end with the flanged collar 183 likewise keyed or fastened to said shaft at 184. A circular sharp-edged skiving knife 185 is clamped to the flange of said collar by means of a clamp screw 186 or the like and in addition a dowel pin such as previously described may be also employed to hold these parts together. Projecting from said bracket is a transversely extending finger or lug 188 normally resting upon the spring 189 in the socket 190 at the bottom of the interior of the head 22. An adjusting screw 191 tapped through the lug 26 engages the top face of said lug 188 for the purpose of rotatably adjusting the bracket 170 and bearing 180 about the rod 164, said spring acting always to maintain said lug 188 against said adjusting screw and to rotate the bracket and its bearing upwardly. By means of this construction, the pinions 163 and 182 are always in mesh irrespective of any angularly adjusted relation of the bracket and the skiving knife 185. Therefore said knife may be adjusted to any angular position with relation to the work face 127 on said feed roll during the operation of the machine without disturbing the relation of the pinions 163 and 182. Some features of this knife adjustment and various other features are not claimed herein because constituting the subject matter of a divisional application, Serial No. 510,710, filed October 27, 1921.

The skiving knife 185 requires frequent sharpenings in order that a clean, smooth-cut scarf shall always be made upon the material. Obviously the frequent removal of the skiving knife for such purpose would result in great loss of time and require that a considerable number of skiving knives always be on hand. Also the skiving angle once having been determined for certain work it is undesirable to shift the angle of the said knife to said working face 127 on the feed roll. Therefore any grinding apparatus should form part of the machine and should be capable of universal adjustment to meet with all angular relations of the skiving knife and for quickly bringing the grinder into and out of knife engaging relation.

The grinder proper comprises an emery or other abrasive disk 194 fixed or secured to the flanged collar 195 and grinder shaft 196 by a set screw 197 or the like. The said flanged collar is also fixed to said shaft by a pin 198 or the like. Adjacent to said collar the shaft is provided with a frusto-conical bearing portion adapted to seat in a similarly shaped bearing 199. The said bearing is uniformly cylindrical throughout its length and a pulley 200 keyed or provided with a set screw 201 is secured to said shaft above the top of the said bearing. This bearing is adjustably clamped in the split socket 203 by the bolts 204 passing through one lug 205 and tapped into the lug 206 on opposite sides of the split 207. The said socket is provided with a cylindrical shank 208 rotatably adjustably mounted in the lug 210 on the inner side of the adjusting plate 211. The shank 208 has a pair of grooves or cut away portions 212 each to be engaged by one of the adjusting set screws 214 tapped through bosses at the top of the lug 210. The adjusting plate 211 is pivoted at its axis on the stud 216 projecting from the circular plate 217 integral with the divided rocker arm 218. The plane of pivotal movement of the plate 211 is at right angles to the plane of rotatable movement of the shank 208. To secure the adjusting plate 211 in adjusted relation to the arm 218 the former has tapped therein at equi-distant points on each side of said stud 216 a pair of clamp bolts 220 passing through semi-circular slots through the circular plate 217. Therefore the grinder disk 194 is adjustable vertically, laterally and transversely to provide any angular relation thereof to the skiving knife to grind it at any desired or required angle irrespective of any angular relation the latter may be adjusted with relation to the feed roll 95. The grinding apparatus may be moved into and out of grinding relation to the said skiving knife. Therefore the rocker arm 218 is pivoted on the vertical shaft 222 passing through the lugs 223 and 224 projecting from the head 22. The said shaft is clamped or held from rotation by the set screw 224ª tapped into the lug 223 and tightly engaging the slotted portion on said shaft. The rocker arm is provided with the bearings 225ª and 225, the latter being elongated and having a recess to receive therein the spring 226 bearing against the lower or inner face of the said bearing and engaging the top face of the hub 227 on the segmental arm 228. The arm 228 is pinned to the shaft 222 at 229. The top of the shaft 222 is provided with a threaded bore 230 into which is screwed the adjusting screw 231 with its lower end bearing against the bar 232 resting on each side of the top of the bearing 225 and slidable vertically in the vertical slot 234 through the said shaft. Therefore rotating the screw 231 will allow of movement of the bar 232 and cause the rocker arm to move upward or downward, the spring 226 maintaining the bearing 225 against said bar and said screw at all times. This adjustment is always in a vertical direction irrespective of all other positions of the grinder. Fine universal adjustments and a vertical feed for said grinder are thus rendered possible.

The segmental arm 228 is provided with a lug 235 having a vertically disposed stud 236 adapted to slide vertically in the bearing lug 237 on the rocker arm 218 between the ends thereof. The opposite end of said arm 228 has a slotted segment 239 through which is passed the wing clamp screw 240 tapped into the lug 241 projecting from the opposite side of the head 22 and adapted to secure the grinder in co-operating relation with the knife 185. In order that the said segment and therefore the grinding mechanism may be moved readily when the said wing nut is released the segment is provided with the handle 242 and to limit the movement of the segment and for close adjustment of the grinder to the knife, the segment has projecting therefrom a lug 243 through which is tapped the adjusting screw 244 adapted to engage with the lug or stop 245 projecting from the frame 20. These features define and adjust the limit of movement of the grinder with relation to the skiving knife edge when the former is moved into grinding relation.

The grinder is rotated at high speed by means of the belt 245 passing about the pulley 200 and over a pair of idler pulleys 246 rotatable on the stub shaft 247. The stubshaft 247 is mounted upon the bracket 248 socketed in the boss 249 at the rear of the frame 20 and is held in a fixed and adjusted position by the clamp screw 250. The belt is then passed about the driving pulley 251 fastened to the inner face of the web 45 of the hand wheel 34 by means of the screws 252. The said belt may be tightened or loosened by adjusting the bracket and idler pulleys from and towards the frame 20 respectively when the grinder is in working relation to the skiving knife. When the grinder is moved away from said knife the rocker arm 218 being of shorter radius than the distance from the stub shaft 247 to the pulley 200 the said pulley will swing towards the stub shaft 247 releasing the driving engagement of the belt therewith by reason of the slack so caused and the grinder will then cease to rotate. The grinder may thus be started rotating and swung into position by a single operation, and a single operation similarly effects the stopping of the rotation of the grinder and its swinging out of operative position.

The mechanism described for supporting, driving and adjusting the skiving knife 185 is of such a universal nature as to permit skiving at any relatively large variation of length and angle of scarf. Also the said knife may be closely adjusted relative to the vertical center line of the feed roll 95 so that the best and most efficient results may be obtained and the skiving operation will commence at the very beginning of the stock or leather and will terminate at the very last edge of the leather, imparting absolute uniformity to the nature and extent of the scarf. Any adjustment of the said knife causes the spiral pinion which is elongated for this purpose to merely slip or rotate or both slip and rotate through the teeth of the spiral gear 162 and no relative unmeshing between the same will occur. The mechanism adapted to produce these adjustable features are readily accessible, simple and efficient in their operation and manipulation. Fine and close adjustments may be quickly had by the adjustable features set forth.

The universally adjustable grinder mechanisms described and illustrated in this embodiment not only permits the grinding wheel to assume any angle to which the skiving knife may be adjusted but in addition the type of edge on said knife may be maintained as originally. That is the grinding wheel may also be adjusted so as to grind a flat shape terminating in the cutting edge of the knife or it may be adjusted so that the the periphery of the grinder will engage the edge of said knife and follow a line of contact to the full extent to which the knife is "backed off" or relieved so as to produce what may be termed a hollow ground knife. A great number of variations of grinding may be had or changes from one style or type of grinding to another may be employed. Therefore the adjustable features, which are of the most simple and efficient construction, permit the desired type of edge being ground on said knife in the quickest manner possible without disturbance of said knife and after such operation the grinder is moved away from the knife and becomes automatically inoperative until regrinding must be had.

All driving is done by the employment of spiral gears or by worm and worm gears the actions of which are preferable to spur gears or bevel gears and the like which disengage or unmesh if their pitch lines or lines of contact are changed by adjustments of the driven parts or elements. Also a very slight distortion of the normal lines of contact cause cramping or binding between the teeth of spur or bevel gears, etc. Spiral gears permit one gear of a pair or set to be moved axially or transversely of the mating gear. The clutch, its actuating mechanisms and the brake mechanism are most simple, compact and efficient in operation producing quick and positive response to starting and stopping the drive.

I have described and illustrated herein for convenience but one embodiment of my invention and the latter is not limited thereto, reference being had to the scope and nature of the appended claims rather than to the said description and illustrated form thereof.

I claim—

1. In a machine of the character described, a driving shaft having a spiral gear, a feed roll and a feed disk rotated by said shaft, a shaft having a knife and a spiral gear mounted thereon, an intermediate spiral gear meshing with said knife-shaft gear and said driving-shaft gear, and means for moving said knife-shaft gear and said intermediate gear transversely of said driving-shaft gear.

2. In a machine of the character described, a driving shaft having a spiral gear, a feed roll and a feed disk rotated by said driving shaft, a shaft having a knife and a spiral gear mounted thereon, an intermediate spiral gear meshing with said knife-shaft gear and said driving-shaft gear, and means for adjusting said knife transversely of the feed roll by moving the knife shaft and the intermediate gear transversely of said driving-shaft gear.

3. In a machine of the character described, a driving shaft having a spiral gear, a feed roll and a feed disk rotated by said driving shaft, a shaft having a knife and a spiral gear mounted thereon, an intermediate gear meshing with said knife-shaft gear and with said driving-shaft gear, means for adjusting the angular relation of the knife relative to the said feed roll by rotating the knife shaft about the axis of the intermediate gear, and means for adjusting said knife transversely of the feed roll by moving the knife shaft and the intermediate gear transversely of the driving-shaft gear.

4. In a machine of the character described, a driving shaft having a spiral gear, a feed roll and a feed disk rotated by said shaft, a shaft having a knife and a spiral gear, a rod transverse to the driving shaft and the knife shaft having an intermediate spiral gear rotatable thereon, and means for adjusting said knife transversely of the feed roll by moving the rod axially.

5. In a machine of the character described, a driving shaft having a spiral gear, a feed roll and a feed disk rotated by said shaft, a shaft having a knife and a spiral gear, a rod transverse to both the knife shaft and the driving shaft having an intermediate spiral gear freely rotatable thereon, for adjusting the knife transversely of the feed roll by axial movement of the rod, and means for adjusting the angular relation of the knife to the feed roll by rotating said knife about the axis of the rod.

6. In a machine of the character described, a driving shaft having a plurality of spiral gears thereon, a feed roll and a feed disk each having a spiral gear driven by a spiral gear on the driving shaft, a shaft having a knife and a spiral gear, a rod transverse to both the knife shaft and the driving shaft having an intermediate spiral gear freely rotatable thereon and driven by one of the driving spiral gears, and means for adjusting said knife by moving the rod axially and by rotating the knife about the rod.

7. In a machine of the character described, a feed roll and a feed disk co-operating one with the other, a revoluble knife co-operating with said roll and said disk, grinding mechanism for the knife, means for adjusting said knife independently of the grinding mechanism in different planes to different angular relations to said feed roll, and means for universally adjusting the grinding mechanism into angular cooperative relation to said knife.

8. In a machine of the character described, a driving shaft having a plurality of spiral gears, a feed roll and a feed disk each having a spiral gear driven by one of said driving-shaft gears, means for adjusting the said roll and the said disk relatively, a revoluble knife having a spiral gear driven by a spiral gear on said shaft, a grinder for sharpening said knife, and means for universally adjusting said grinder into angular relation to said knife.

9. A machine of the character described having, in combination, a frame having an opening, a knife supported on the frame, a bearing rockably mounted within the opening, means preventing axial and rotative movements of the bearing but permitting rocking movements thereof, a shaft mounted in the bearing, and means for feeding material to the knife operated from the shaft.

10. In a machine of the character described, a frame having an inwardly projecting hub, a bearing tapering from the middle thereof towards each end rockably mounted within the hub and having a bore at the middle thereof, a screw mounted in the frame having a stud on the end thereof fitting in the bore to maintain the bearing within the bore, thereby to prevent axial and rotative movements of the bearing but permitting rocking movements thereof about the stud as an axis, and a shaft mounted in the bearing having a feed roll.

11. In a machine of the character described, a shaft having a knife and a gear, a gear meshing with the first-named gear, and means for transversely moving the shaft, the knife and the gears without effecting disengagement of the gears.

12. In a machine of the character described, a driving shaft having a gear, a driven shaft having a gear secured thereto meshing with the first-named gear, and means whereby the driven shaft and the gear secured thereto may be moved axially and transversely without disengaging the gears.

13. A machine of the character described having, in combination, a frame, a shaft mounted on the frame having a gear, a rod mounted on the frame against transverse movement, the rod being movable axially, a bracket mounted on the frame to move with the rod, a gear in the bracket and freely rotatable about the rod, the second-named gear meshing with the first-named gear, means for adjusting the rod axially, and means whereby the bracket and the gear carried by the bracket may be adjusted with the rod while maintaining the gears in mesh.

14. A machine of the character described having, in combination, a frame, a shaft mounted therein having a gear, a bracket adjustably mounted in the frame having a bearing, a rod mounted in the frame and the bracket, a gear freely rotatable upon the rod meshing with the first-named gear, a shaft mounted in the bearing having a knife and a gear meshing with the second-named gear, means for rotatably and transversely adjusting the bracket and the bearing without effecting disengagement of said gears, and means for feeding material to the knife.

15. In a machine of the character described, a frame, a knife mounted thereon, a stationary shaft mounted upon the frame, an arm pivotally mounted about the shaft, a spring tending to actuate the arm in one direction along the shaft, means for adjusting the shaft in the opposite direction in opposition to the spring, and a grinder for the knife carried by the arm.

16. In a machine of the character described, a frame having a tongue, a recessed bearing adjustably mounted upon the frame having a groove engaged with the tongue, a shaft mounted in the bearing through the recess thereof, a washer slidable upon the shaft in the recess and rotatably fixed with respect thereto, a collar fixed to the shaft in the recess and a spring interposed between the washer and the collar, whereby the shaft is adapted to yield axially.

17. A skiving machine having, in combination, a frame, a skiving knife mounted at one end of the frame, means for actuating the knife, an arm intermediately pivoted to the frame intermediately of the frame, a grinder for the knife mounted upon the arm at one side of the pivot, means mounted upon the arm the other side of the pivot for pivotally moving the arm about the pivot to move the grinder into and out of grinding relation to the knife and for rendering the actuating means effective when the grinder is moved into grinding relation to the knife and ineffective when the grinder is moved out of grinding relation to the knife, and means for securing the arm to the frame with the grinder in grinding relation to the knife.

18. In a machine of the character described, a frame, a shaft mounted therein having a gear, a rod having an enlarged head mounted in the frame, a gear freely rotatable upon the rod meshing with the first-named gear, a bracket adjustably mounted upon the frame, the rod being mounted also in the bracket and the head of the rod engaging the bracket, means yieldingly maintaining the bracket in engagement with the head, and means for slidingly actuating the rod to adjust the bracket without effecting disengagement of the gears.

19. In a machine of the character described, a pivotally adjustably mounted plate having a lug, a shank provided with a split socket rotatably adjustably mounted in the lug, the plane of pivotal movement of the plate being at right angles to the plane of rotatable movement of the shank, and a shaft longitudinally adjustably mounted in the split socket, whereby the shaft is adjustable longitudinally, laterally and transversely.

20. In a machine of the character described, a frame, a skiving knife supported thereon, a bracket secured to the frame supporting idler pulleys, an arm pivoted to the frame between the bracket and the knife, a grinder revolubly supported upon the arm having a pulley, the grinder being movable into and out of cooperative relation to the knife, and a belt passing over said pulleys to actuate the grinder when the grinder is in cooperative relation to the knife and being adapted to be tightened when the arm is pivotally moved to move the grinder into cooperative relation to the knife, the belt becoming slack so as to be ineffective to actuate the grinder upon the arm being moved to actuate the grinder out of cooperative relation to the knife.

21. In a machine of the character described, a frame, a knife mounted thereon, an arm pivotally mounted upon the frame, a grinder for the knife mounted upon the arm, whereby the grinder may be moved into and out of grinding relation to the knife, the grinder being adjustable longitudinally, laterally and transversely upon the arm, and means whereby the arm may be longitudinally adjusted upon the frame.

22. A skiving machine having, in combination, a frame, a skiving knife mounted at one end of the frame, an arm intermediately pivoted to the frame intermediately of the frame, a grinder for the knife mounted upon the arm at one side of the pivot and having a pulley, means mounted upon the arm at the other side of the pivot for pivotally moving the arm about the pivot to move the grinder into and out of grinding relation to the knife, a belt passing over the pulley to actuate the grinder when the grinder is in grinding relation to the knife and being adapted to be tightened when the arm is pivotally moved to move the grinder into grinding relation to the knife, and means for slackening the belt so as to render the belt ineffective to actuate the grinder upon the grinder being moved out of grinding relation to the knife.

23. In a machine of the character described, a rod, a gear freely rotatable on the rod, means for adjusting the rod and the gear axially, and means yieldingly maintaining the rod and the gear in adjusted position.

24. A machine of the character described having, in combination, a rod, a gear freely rotatable on the rod, means for rotating the gear, a shaft having a knife and a gear meshing with the freely rotatable gear, means for adjusting the rod and the gear rotatable thereon axially, and means yieldingly maintaining the rod and the gear rotatable thereon in adjusted position.

25. A machine of the character described having, in combination, a frame, a shaft mounted in the frame having a gear, a bracket adjustably mounted on the frame, a rod mounted in the frame and the bracket, a gear in the bracket freely rotatable upon the rod meshing with the shaft gear so as to be driven thereby, a shaft having a knife and a gear meshing with the freely rotatable gear, whereby power is transmitted from the shaft gear to the knife gear, means for adjusting the rod axially, means whereby axial adjustment of the rod is communicated to the bracket and the freely rotatable gear therein, and means yieldingly maintaining the bracket in adjusted position.

26. A machine of the character described having, in combination, a knife, means for feeding material to the knife, the effective cutting edge of the knife being tangent to a perpendicular to the direction of feed, means for adjusting the knife in the direction of feed, and means yieldingly maintaining the knife in adjusted position.

27. A machine of the character described having, in combination, a frame, a bracket mounted in the frame having a bore, a knife carried by the bracket, means for adjusting the bracket in a direction perpedicular to a tangent to the effective cutting edge of the knife, and a compression spring located in the bore and acting against the frame to yieldingly maintain the bracket in adjusted position.

28. A skiving machine having, in combination, a skiving knife, means for feeding material to be skived to the knife, a grinder for sharpening the knife, means for adjusting the knife parallel to the line of feed independently of the grinder, and means for universally adjusting the grinder in cooperative relation to the knife.

29. A skiving machine having, in combination, a rotary skiving knife, means for feeding material to be skived to the knife, a grinder for sharpening the knife, means for angularly adjusting the knife transversely of the feed means in different planes independently of the grinder, and means for universally adjusting the grinder into cooperative relation to the knife.

In testimony whereof I have signed my name to this specification.

ANDREW R. RIDDERSTROM.